(No Model.)
A. B. NOBEL & G. FEHRENBACH.
MANUFACTURE OF ANHYDROUS SULPHURIC ACID.
No. 310,147. Patented Dec. 30, 1884.
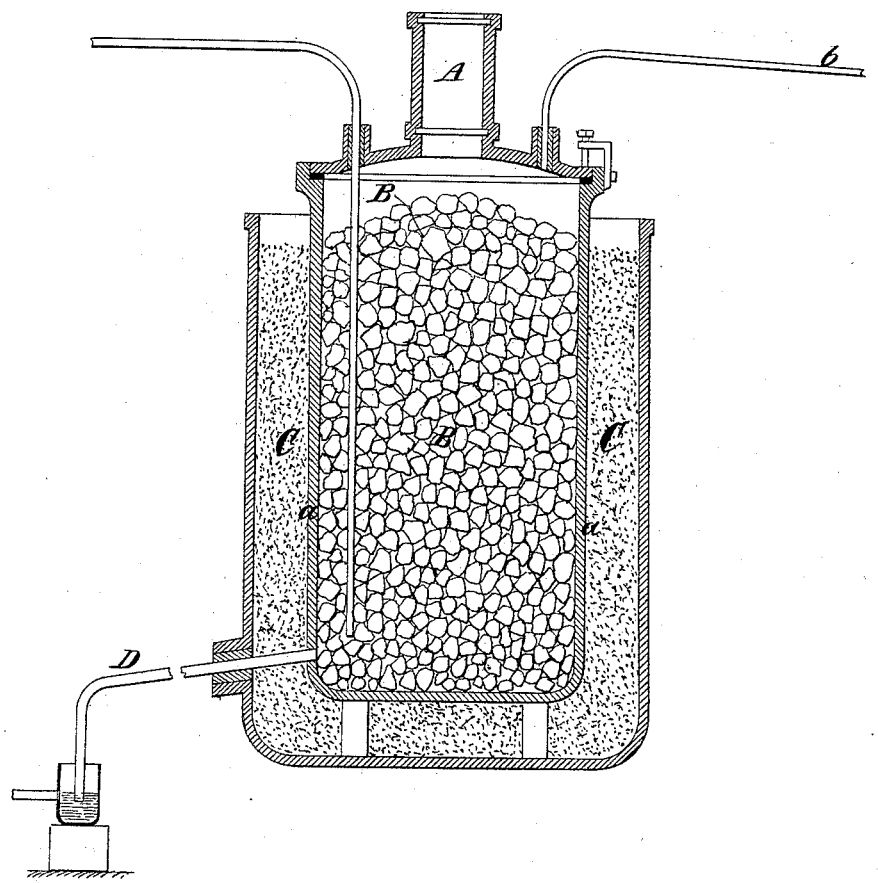
Witnesses:
O. L. Sundgren
C. E. McDonald
Inventor:
Alfred B. Nobel
Georges Fehrenbach
by their Attys
Brown & Hall

UNITED STATES PATENT OFFICE.

ALFRED BERNHARD NOBEL AND GEORGES FEHRENBACH, OF PARIS, FRANCE.

MANUFACTURE OF ANHYDROUS SULPHURIC ACID.

SPECIFICATION forming part of Letters Patent No. 310,147, dated December 30, 1884.

Application filed August 15, 1884. (No model.)

*To all whom it may concern:*

Be it known that we, ALFRED BERNHARD NOBEL and GEORGES FEHRENBACH, residing at the city of Paris, in the Republic of France, have invented new and useful Improvements in the Manufacture of Anhydrous Sulphuric Acid, of which the following is a specification, reference being had to the accompanying drawing.

We produce sulphuric anhydride by heating together mixed monohydrated phosphoric acid and highly concentrated sulphuric acid, or by letting vapors of such sulphuric acid pass over a column of fragments of monohydrated, commonly called "glacial," phosphoric acid. In either case a dishydration of the sulphuric acid takes place, and sulphuric anhydride is distilled over and is condensed in a cooled receiver.

In order to understand the nature of this improvement, it should be clearly borne in mind that it is not anhydrous phosphoric acid—a very expensive chemical—of which we make use, but hydrated phosphoric acid, which is made to serve the same purpose over and over again by merely evaporating the additional water which it has taken up, thus reproducing the monohydrate needed for dishydrating a fresh portion of sulphuric acid.

The drawing illustrates a vertical section of an apparatus constructed and arranged for the purpose of producing anhydrous sulphuric acid according to our invention. This apparatus is capable of continual action.

$a$ is a cylinder of platinum, earthenware, or other material capable of resisting the action of sulphuric and phosphoric acid. Iron is attacked, though slightly. B is a column of monohydrated phosphoric acid. C is a sand bath or bath of iron-filings surrounding the cylinder $a$, by means of which we keep the phosphoric acid B at a temperature most suitable for the reaction, and which coincides with the boiling point of monohydrated sulphuric acid.

When vapors of sulphuric acid are let into the cylinder $a$ and pass through the column of glacial phosphoric acid, the latter takes up water and also part of the sulphuric acid, and liquefies. It is then drawn off through the outlet-tube $d$. On the other hand, fresh glacial phosphoric acid is introduced into $a$ through double stoppers in the neck A, provided to prevent as much as possible the waste of sulphuric vapor with which the interior of the cylinder is filled. $b$ is the tube through which the vapors of sulphuric anhydride escape into a well-cooled receiver, which condenses them. The liquefied phosphoric acid is drawn off through the tube D, and retains some of the sulphuric acid. By adding a small quantity of water and applying heat the sulphuric acid may be easily distilled out, leaving only hydrated phosphoric acid, from which glacial phosphoric acid is reproduced in the usual way, ready to be used for dishydrating sulphuric acid according to our invention.

What we claim as our invention, and desire to secure by Letters Patent, is—

The improvement in the manufacture of anhydrous sulphuric acid, consisting in subjecting sulphuric acid to the dishydrating influence of hydrated phosphoric acid, substantially as herein described.

In testimony whereof we have signed our names to this specification in the presence of two subscribing witnesses.

ALFRED BERNHARD NOBEL.
GEORGES FEHRENBACH.

Witnesses:
   EM. DOLNITSCHER,
   CLARENCE M. HYDE.

Witnesses as to the signature of Georges Fehrenbach:
   ROBT. M. HOOPER,
   DAVID T. S. FULLER.